US007656509B2

(12) United States Patent
Haddock et al.

(10) Patent No.: US 7,656,509 B2
(45) Date of Patent: Feb. 2, 2010

(54) OPTICAL RANGEFINDER FOR AN ELECTRO-ACTIVE LENS

(75) Inventors: Joshua N. Haddock, Roanoke, VA (US); William Kokonaski, Gig Harbor, WA (US); Dwight P. Duston, Laguna Niguel, CA (US); Ronald D. Blum, Roanoke, VA (US); Scott N. Richman, Irvine, CA (US)

(73) Assignee: PixelOptics, Inc., Roanoke, VA (US)

( * ) Notice: Subject to any disclaimer, the term of this patent is extended or adjusted under 35 U.S.C. 154(b) by 0 days.

(21) Appl. No.: 11/802,413

(22) Filed: May 22, 2007

(65) Prior Publication Data

US 2007/0280626 A1 Dec. 6, 2007

Related U.S. Application Data

(60) Provisional application No. 60/802,802, filed on May 24, 2006, provisional application No. 60/802,803, filed on May 24, 2006, provisional application No. 60/873,962, filed on Dec. 11, 2006, provisional application No. 60/876,474, filed on Dec. 22, 2006.

(51) Int. Cl.
*G01C 3/08* (2006.01)
(52) U.S. Cl. .................................................... 356/4.07
(58) Field of Classification Search ................. 356/4.07
See application file for complete search history.

(56) References Cited

U.S. PATENT DOCUMENTS

| 2,437,642 A | 3/1948 | Henroleau |
| 2,576,581 A | 11/1951 | Edwards |
| 3,161,718 A | 12/1964 | De Luca |

(Continued)

FOREIGN PATENT DOCUMENTS

CN ROC89113088 7/1987

(Continued)

OTHER PUBLICATIONS

Kowel, Stephen T., et. al; Focusing by electrical modulation of refraction in a liquid crystal cell; Applied Optics; Jan. 15, 1984; vol. 23, No. 2.

(Continued)

*Primary Examiner*—Thomas H Tarcza
*Assistant Examiner*—Luke D Ratcliffe
(74) *Attorney, Agent, or Firm*—Townsend and Townsend and Crew LLP (57) ABSTRACT

Several devices for determining a distance of an object a user of an electro-active lens is looking at are presented. Once the distance is determined, the devices may alter the optical power of the electro-active lens to ensure that the object is correctly focused. Optical range finding is a possible means for carrying out this task. An active rangefinder may emit optical radiation from a transmitter directed at the object. The optical radiation may then be reflected off the object. The reflected optical radiation may then be received with an appropriate receiver. The received optical radiation may then be processed by appropriate circuitry to determine a distance to the object. A passive rangefinder works without a transmitter. Instead, an appropriate receiver receives ambient sources of light from the object. The received light may then be processed by appropriate circuitry to determine a distance to the object.

15 Claims, 5 Drawing Sheets

U.S. PATENT DOCUMENTS

| | | | |
|---|---|---|---|
| 3,245,315 | A | 4/1966 | Marks et al. |
| 3,309,162 | A | 3/1967 | Kosanke et al. |
| 3,614,215 | A | 10/1971 | Mackta |
| 3,738,734 | A | 6/1973 | Tait et al. |
| 3,791,719 | A | 2/1974 | Kratzer et al. |
| 4,174,156 | A | 11/1979 | Glorieux |
| 4,181,408 | A | 1/1980 | Senders |
| 4,190,330 | A | 2/1980 | Berreman |
| 4,264,154 | A | 4/1981 | Petersen |
| 4,279,474 | A | 7/1981 | Belgorod |
| 4,300,818 | A | 11/1981 | Schachar |
| 4,373,218 | A | 2/1983 | Schachar |
| 4,395,736 | A | 7/1983 | Fraleux |
| 4,418,990 | A | 12/1983 | Gerber |
| 4,423,929 | A | 1/1984 | Gomi |
| 4,457,585 | A | 7/1984 | DuCorday |
| 4,466,703 | A | 8/1984 | Nishimoto |
| 4,466,706 | A | 8/1984 | Lamothe, II |
| 4,529,268 | A | 7/1985 | Brown |
| 4,564,267 | A | 1/1986 | Nishimoto |
| 4,572,616 | A | 2/1986 | Kowel et al. |
| 4,577,928 | A | 3/1986 | Brown |
| 4,601,545 | A | 7/1986 | Kern |
| 4,609,824 | A | 9/1986 | Munier et al. |
| 4,712,870 | A | 12/1987 | Robinson et al. |
| 4,756,605 | A | 7/1988 | Okada et al. |
| 4,772,094 | A | 9/1988 | Sheiman |
| D298,250 | S | 10/1988 | Kildall |
| 4,787,733 | A | 11/1988 | Silva |
| 4,787,903 | A | 11/1988 | Grendahl |
| 4,795,248 | A | 1/1989 | Okada et al. |
| 4,813,777 | A | 3/1989 | Rainville et al. |
| 4,818,095 | A | 4/1989 | Takeuchi |
| 4,836,652 | A | 6/1989 | Oishi et al. |
| 4,842,400 | A | 6/1989 | Klein |
| 4,880,300 | A | 11/1989 | Payner et al. |
| 4,890,903 | A | 1/1990 | Treisman et al. |
| 4,904,063 | A | 2/1990 | Okada et al. |
| 4,907,860 | A | 3/1990 | Noble |
| 4,909,626 | A | 3/1990 | Purvis et al. |
| 4,919,520 | A | 4/1990 | Okada et al. |
| 4,921,728 | A | 5/1990 | Takiguchi |
| 4,927,241 | A | 5/1990 | Kuijk |
| 4,929,865 | A | 5/1990 | Blum |
| 4,930,884 | A | 6/1990 | Tichenor et al. |
| 4,944,584 | A | 7/1990 | Maeda et al. |
| 4,945,242 | A | 7/1990 | Berger et al. |
| 4,952,788 | A | 8/1990 | Berger et al. |
| 4,958,907 | A | 9/1990 | Davis |
| 4,961,639 | A | 10/1990 | Lazarus |
| 4,968,127 | A | 11/1990 | Russell et al. |
| 4,981,342 | A | 1/1991 | Fiala |
| 4,991,951 | A | 2/1991 | Mizuno et al. |
| 5,015,086 | A | 5/1991 | Okaue et al. |
| 5,030,882 | A | 7/1991 | Solero |
| 5,050,981 | A | 9/1991 | Roffman |
| 5,066,301 | A | 11/1991 | Wiley |
| 5,067,795 | A | 11/1991 | Senatore |
| 5,068,737 | A * | 11/1991 | Taniguchi et al. ........... 348/353 |
| 5,073,021 | A | 12/1991 | Marron |
| 5,076,665 | A | 12/1991 | Petersen |
| 5,089,023 | A | 2/1992 | Swanson |
| 5,091,801 | A | 2/1992 | Ebstein |
| 5,108,169 | A | 4/1992 | Mandell |
| 5,114,628 | A | 5/1992 | Hofer et al. |
| 5,130,856 | A | 7/1992 | Tichenor et al. |
| 5,142,411 | A | 8/1992 | Fiala |
| 5,150,234 | A | 9/1992 | Takahashi et al. |
| 5,171,266 | A | 12/1992 | Wiley et al. |
| 5,182,585 | A | 1/1993 | Stoner |
| 5,184,156 | A | 2/1993 | Black et al. |
| 5,200,859 | A | 4/1993 | Payner et al. |
| 5,208,688 | A | 5/1993 | Fergason et al. |
| 5,229,797 | A | 7/1993 | Futhey et al. |
| 5,229,885 | A | 7/1993 | Quaglia |
| 5,231,430 | A | 7/1993 | Kohayakawa |
| 5,239,412 | A | 8/1993 | Naka et al. |
| D342,063 | S | 12/1993 | Howitt et al. |
| 5,306,926 | A | 4/1994 | Yonemoto |
| 5,324,930 | A | 6/1994 | Jech, Jr. |
| D350,342 | S | 9/1994 | Sack |
| 5,352,886 | A | 10/1994 | Kane |
| 5,359,444 | A | 10/1994 | Piosenka et al. |
| 5,375,006 | A | 12/1994 | Haas |
| 5,382,986 | A | 1/1995 | Black et al. |
| 5,386,308 | A | 1/1995 | Michel et al. |
| 5,424,927 | A | 6/1995 | Schaller et al. |
| 5,440,357 | A | 8/1995 | Quaglia |
| 5,443,506 | A | 8/1995 | Garabet |
| 5,451,766 | A | 9/1995 | Van Berkel |
| 5,488,439 | A | 1/1996 | Weltmann |
| 5,522,323 | A | 6/1996 | Grupp |
| 5,552,841 | A | 9/1996 | Gallorini et al. |
| 5,589,822 | A | 12/1996 | Stern |
| 5,608,567 | A | 3/1997 | Grupp |
| 5,615,588 | A | 4/1997 | Gottschald |
| 5,654,786 | A | 8/1997 | Bylander |
| 5,668,620 | A | 9/1997 | Kurtin et al. |
| 5,682,223 | A | 10/1997 | Menezes et al. |
| 5,683,457 | A | 11/1997 | Gupta et al. |
| RE35,691 | E | 12/1997 | Theirl et al. |
| 5,712,721 | A | 1/1998 | Large |
| 5,728,155 | A | 3/1998 | Anello et al. |
| 5,739,959 | A | 4/1998 | Quaglia |
| 5,777,719 | A | 7/1998 | Williams et al. |
| 5,815,233 | A | 9/1998 | Morokawa et al. |
| 5,815,239 | A | 9/1998 | Chapman et al. |
| 5,861,936 | A | 1/1999 | Sorensen |
| 5,877,876 | A | 3/1999 | Birdwell |
| 5,900,720 | A | 5/1999 | Kallman et al. |
| 5,949,521 | A | 9/1999 | Williams et al. |
| 5,953,098 | A | 9/1999 | Lieberman et al. |
| 5,956,183 | A | 9/1999 | Epstein et al. |
| 5,963,300 | A | 10/1999 | Horwitz |
| 5,971,540 | A | 10/1999 | Ofner |
| 5,980,037 | A | 11/1999 | Conway |
| 5,999,328 | A | 12/1999 | Kurtin et al. |
| 6,040,947 | A | 3/2000 | Kurtin et al. |
| 6,050,687 | A | 4/2000 | Bille et al. |
| 6,069,742 | A | 5/2000 | Silver |
| 6,086,204 | A * | 7/2000 | Magnante ................... 351/212 |
| 6,095,651 | A | 8/2000 | Williams et al. |
| 6,099,117 | A | 8/2000 | Gregory |
| 6,115,177 | A | 9/2000 | Vossler |
| 6,145,987 | A | 11/2000 | Baude et al. |
| 6,188,525 | B1 | 2/2001 | Silver |
| 6,191,881 | B1 | 2/2001 | Tajima |
| 6,213,602 | B1 | 4/2001 | Smarto |
| 6,270,220 | B1 | 8/2001 | Keren |
| 6,271,915 | B1 | 8/2001 | Frey et al. |
| 6,305,802 | B1 | 10/2001 | Roffman et al. |
| 6,325,508 | B1 | 12/2001 | Decreton et al. |
| 6,350,031 | B1 | 2/2002 | Lashkari et al. |
| 6,396,622 | B1 | 5/2002 | Alden |
| 6,437,762 | B1 | 8/2002 | Birdwell |
| 6,437,925 | B1 | 8/2002 | Nishioka |
| 6,464,363 | B1 | 10/2002 | Nishioka et al. |
| 6,491,394 | B1 | 12/2002 | Blum et al. |
| 6,501,443 | B1 | 12/2002 | McMahon |
| 6,554,425 | B1 | 4/2003 | Roffman et al. |
| 6,609,794 | B2 | 8/2003 | Levine |
| 6,614,408 | B1 | 9/2003 | Mann |
| 6,616,275 | B1 | 9/2003 | Dick et al. |
| 6,616,279 | B1 | 9/2003 | Davis et al. |

| | | | | | |
|---|---|---|---|---|---|
| 6,618,208 B1 | 9/2003 | Silver | JP | 55-076323 | 6/1980 |
| 6,626,532 B1 | 9/2003 | Nishioka et al. | JP | 1 237610 | 9/1989 |
| 6,631,001 B2 | 10/2003 | Kuiseko | JP | 05-100201 | 4/1993 |
| 6,667,803 B1 * | 12/2003 | Flessland et al. ............ 356/319 | JP | 05100201 | 4/1993 |
| 6,682,195 B2 | 1/2004 | Dreher | JP | 11352445 | 12/1998 |
| 6,709,108 B2 | 3/2004 | Levine et al. | WO | WO-92/01417 | 2/1992 |
| 6,738,199 B2 | 5/2004 | Nishioka | WO | WO-98/27863 | 7/1998 |
| 6,768,536 B2 | 7/2004 | Okuwaki et al. | WO | WO-99/27334 | 6/1999 |
| 6,774,871 B2 | 8/2004 | Birdwell | WO | WO-03/050472 A1 | 6/2003 |
| 6,778,246 B2 | 8/2004 | Sun et al. | WO | WO-03/068059 A2 | 8/2003 |
| 6,833,938 B2 | 12/2004 | Nishioka | WO | WO-2004/008189 A1 | 1/2004 |
| 6,840,619 B2 | 1/2005 | Dreher | WO | WO-2004/015481 A1 | 2/2004 |
| 6,851,805 B2 | 2/2005 | Blum et al. | WO | WO-2004/034095 A2 | 4/2004 |
| 6,893,124 B1 | 5/2005 | Kurtin | WO | WO-2004/072687 A2 | 8/2004 |
| 6,918,670 B2 | 7/2005 | Blum et al. | WO | WO 2005/057252 A2 | 6/2005 |
| 6,948,818 B2 | 9/2005 | Williams et al. | | | |
| 6,951,391 B2 | 10/2005 | Morris et al. | | | |
| 6,986,579 B2 | 1/2006 | Blum et al. | | | |
| 7,008,054 B1 | 3/2006 | Kurtin et al. | | | |
| 7,009,757 B2 | 3/2006 | Nishioka et al. | | | |
| 7,019,890 B2 | 3/2006 | Meredith et al. | | | |
| 7,041,133 B1 | 5/2006 | Azar | | | |
| 7,085,065 B2 | 8/2006 | Silver | | | |
| 7,133,172 B2 | 11/2006 | Nishioka | | | |
| 2001/0048519 A1 * | 12/2001 | Bamji et al. .................. 356/5.1 | | | |
| 2002/0140899 A1 | 10/2002 | Blum et al. | | | |
| 2002/0149739 A1 | 10/2002 | Perrott et al. | | | |
| 2002/0186346 A1 | 12/2002 | Stantz et al. | | | |
| 2003/0018383 A1 | 1/2003 | Azar | | | |
| 2003/0151721 A1 | 8/2003 | Lai et al. | | | |
| 2003/0210377 A1 | 11/2003 | Blum et al. | | | |
| 2003/0231293 A1 * | 12/2003 | Blum et al. ................. 356/5.01 | | | |
| 2004/0008319 A1 | 1/2004 | Lai et al. | | | |
| 2004/0051846 A1 | 3/2004 | Blum et al. | | | |
| 2004/0070745 A1 * | 4/2004 | Lewis et al. ................ 356/5.01 | | | |
| 2004/0084790 A1 | 5/2004 | Blum et al. | | | |
| 2004/0108971 A1 | 6/2004 | Waldern et al. | | | |
| 2004/0117011 A1 | 6/2004 | Aharoni et al. | | | |
| 2004/0130677 A1 | 7/2004 | Liang et al. | | | |
| 2004/0179280 A1 | 9/2004 | Nishioka | | | |
| 2004/0196435 A1 | 10/2004 | Dick et al. | | | |
| 2004/0246440 A1 | 12/2004 | Andino et al. | | | |
| 2005/0073739 A1 | 4/2005 | Meredith | | | |
| 2005/0124983 A1 | 6/2005 | Frey et al. | | | |
| 2005/0219460 A1 | 10/2005 | Blum et al. | | | |
| 2006/0044510 A1 | 3/2006 | Williams et al. | | | |
| 2006/0095128 A1 | 5/2006 | Blum et al. | | | |

FOREIGN PATENT DOCUMENTS

| | | |
|---|---|---|
| DE | 4223395 | 1/1994 |
| EP | 0154962 A2 | 9/1985 |
| EP | 0233104 A1 | 8/1987 |
| EP | 0237365 A1 | 9/1987 |
| GB | 2170613 A | 8/1986 |
| GB | 2169417 A | 7/1987 |

OTHER PUBLICATIONS

Thibos, Larry N., et. al.; Vision through a liquid-crystal spatial light modulator; Adaptive Optics Conference; 1999; Durham, UK.

Miller, Donald T., et. al.; Requirements for Segmented Spatial Light Modulators For Diffraction-Limited Imaging Through Aberrated Eyes, Adaptive Optics Conference.

Thibos, Larry N., et. al.; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et. al.; Electronic Spectacles for the 21$^{st}$ Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1.

Naumov, A.F.; Control Optimization of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics: Liquid Crystals Lower the Cost of Adaptive Optics; Laser Focus World, Dec. 1999.

Davis, Robert A.; Computer Vision Syndrome- The Eyestrain Epidemic ; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

WIPO, International Search Report dated Mar. 25, 2004, International Patent Application No. PCT/US03/25796.

WIPO, PCT International Search Report, mailing date Aug. 11, 2003, PCT/US03/12528.

European Search Report, dated Dec. 12, 2006, Application No. EP 03 07 8447.

International Search Report issued in International Application No. PCT/US2007/012143, completed on Aug. 20, 2008, pp. 1-36.

* cited by examiner

Attorney Docket #: P-8938-US

OPTICAL RANGEFINDER FOR AN ELECTRO-ACTIVE LENS

CROSS REFERENCE TO RELATED APPLICATIONS

This application claims priority from and incorporates by reference in their entirety the following U.S. Provisional Patent Applications:

Ser. No. 60/802,802, titled "Optical Rangefinder for Activating Electro-Active Spectacle Lenses Based on a Threshold Measurement of Optical Intensity", filed on May 24, 2006;

Ser. No. 60/802,803, titled "Reduction of Specular Reflections When Using an Optical Rangefinder to Operate Electro-Active Spectacle Lenses", filed on May 24, 2006;

Ser. No. 60/873,962, titled "Passive Rangefinder", filed on Dec. 11, 2006; and

Ser. No. 60/876,474, titled "Passive Rangefinder", filed on Dec. 22, 2006.

BACKGROUND OF THE INVENTION

1. Field of the Invention

The present invention relates to rangefinder devices. More specifically, the present invention relates to rangefinder devices for electro-active lenses.

2. Description of the Prior Art

Presbyopia is the loss of accommodation of the crystalline lens of the human eye that often accompanies aging. This loss of accommodation results in an inability to focus on near objects. The standard tools for correcting presbyopia are multi-focal spectacle lenses. A multi-focal lens is a lens that has more than one focal length (i.e. optical power) for correcting focusing problems across a range of distances. Multi-focal spectacle lenses work by means of a division of the lens's area into regions of different optical powers. Typically, a relatively large area located in the upper portion of the lens corrects for far distance vision errors, if any. A small area located in the bottom portion of the lens provides additional optical power for correcting near distance vision errors caused by presbyopia. A multifocal lens may also contain a small region located in the middle portion of the lens which provides additional optical power for correcting intermediate distance vision errors. Near distance is defined as being approximately 8" to approximately 17" from the wearer's eyes, intermediate distance is defined as being approximately 17" to approximately 42" from the wearer's eyes, and far distance is defined as being greater than approximately 42" from the wearer's eyes.

The transition between the regions of different optical power may be either abrupt, as is the case for bifocal and trifocal lenses, or smooth and continuous, as is the case with progressive addition lenses. There are problems associated with these two approaches that can be objectionable to some patients. The visible line of demarcation associated with bifocals and trifocals can be aesthetically displeasing. Additionally, the abrupt change in optical power between regions may cause image jump. The smooth transition regions associated with progressive addition lenses cause unwanted astigmatism in the lens leading to blurred and distorted vision, which, in some patients, causes physical discomfort. Furthermore, in both approaches, the placement of the near vision correction area near the bottom edge of the lens requires patients to adopt a somewhat unnatural downward gaze for near vision tasks.

Electro-active lenses are an attractive alternative to conventional multifocal lenses. In an electro-active lens, an electro-active optical element may be embedded within or attached to an optical substrate. The optical substrate may be a finished, semi-finished or unfinished lens blank. When a semi-finished or unfinished lens blank is used, the lens blank may be finished during manufacturing of the lens to have one or more optical powers. An electro-active optical element may also be embedded within or attached to a conventional optical lens. The conventional optical lens may be a single focus lens or a multi-focal lens such as a progressive addition lens or a bifocal or trifocal lens. The electro-active optical element may be located in a portion or in the entire viewing area of the electro-active lens. The electro-active optical element may be spaced from the peripheral edge of the optical substrate for edging the electro-active lens for spectacles. The electro-active element may be located near the top, middle or bottom portion of the lens. When substantially no voltage is applied, the electro-active optical element may be in a deactivated state in which it provides substantially no optical power. In other words, when substantially no voltage is applied, the electro-active optical element may have the same refractive index as the optical substrate in which it is embedded. When voltage is applied, the electro-active optical element may be in an activated state in which it provides optical add power. In other words, when voltage is applied, the electro-active optical element may have a different refractive index than the optical substrate in which it is embedded.

Electro-active lenses may be used to correct for conventional or non-conventional errors of the eye. The correction may be created by the electro-active element, the conventional optical lens or by a combination of the two. Conventional errors of the eye include near-sightedness, far-sightedness, presbyopia, and astigmatism. Non-conventional errors of the eye include higher-order aberrations, irregular astigmatism, and ocular layer irregularities.

Liquid crystal may be used as a portion of the electro-active optical element as the refractive index of a liquid crystal can be changed by generating an electric field across the liquid crystal. Such an electric field may be generated by applying one or more voltages to electrodes located on both sides of the liquid crystal. Liquid crystal based electro-active optical elements may be particularly well suited for use as a portion of the electro-active optical element since it can provide the required range of optical add powers (plano to +3.00D). This range of optical add powers may be capable of correcting presbyopia in the majority of patients. Finally, liquid crystal can be used to make optics having a diameter greater than 10 mm, which is the minimum size necessary to avoid user discomfort.

A thin layer of liquid crystal (less than 10 μm) may be used to construct the electro-active multi-focal optic. When a thin layer is employed, the shape and size of the electrode(s) may be used to induce certain optical effects within the lens. Electrodes may be "patterned", which is defined herein as meaning the electrodes may have any size, shape, and arrangement such that with the application of appropriate voltages to the electrodes the optical power created by the liquid crystal is created diffractively. For example, a diffractive grating can be dynamically produced within the liquid crystal by using concentric ring shaped electrodes. Such a grating can produce an optical add power based upon the radii of the rings, the widths of the rings, and the range of voltages separately applied to the different rings. Electrodes may be "pixilated", which is defined herein as meaning the electrodes may have any size, shape, and arrangement such that each electrode is individually addressable. Furthermore, because the electrodes are individually addressable, any arbitrary pattern of voltages may be applied to the electrodes. For example, pixilated electrodes may be squares or rectangles arranged in a Cartesian array or hexagons arranged in a hexagonal array. Such an array of pixilated electrodes may be used to generate optical add powers by emulating a diffractive, concentric ring electrode structure. Pixilated electrodes may also be used to correct for higher-order aberrations of the eye in a manner similar to that used for correcting atmospheric turbulence effects in ground-based astronomy. This technique, referred to as adaptive optics, can be either refractive or diffractive and is well known in the art.

Alternately, a single continuous electrode may be used alone or with a specialized optical structure known as a surface relief diffractive optic. Such an optic contains a physical substrate which may be designed to have a fixed optical power and/or aberration correction. By applying voltage to the liquid crystal through the electrode, the power/aberration correction can be switched on and off by means of refractive index mismatching and matching, respectively. The required operating voltages for such thin layers of liquid crystal may be quite low, typically less than 5 volts.

A thicker layer of liquid crystal (typically >50 μm) may also be used to construct the electro-active multi-focal optic. For example, a modal lens may be employed to create a refractive optic. Known in the art, modal lenses incorporate a single, continuous low conductivity circular electrode surrounded by, and in electrical contact with, a single high conductivity ring-shaped electrode. Upon application of a single voltage to the high conductivity ring electrode, the low conductivity electrode, essentially a radially symmetric, electrically resistive network, produces a voltage gradient across the layer of liquid crystal, which subsequently induces a refractive index gradient in the liquid crystal. A layer of liquid crystal with a refractive index gradient will function as an electro-active lens and will focus light incident upon it. Regardless of the thickness of the liquid crystal layer, the electrode geometry or the errors of the eye that the electro-active element corrects for, such electro-active spectacle lenses may be fabricated in a manner very similar to liquid crystal displays and in doing so would benefit from the mature parent technology.

An electro-active spectacle lens that provides correction for presbyopia may have to change the optical add power that it provides as a user of the lens looks at objects at different distances. An object that is far away from the user may require less optical add power than an object that is near the user.

Thus, a device is needed which can detect the distance of viewed objects from the user and change the optical power of the electro-active lens such that these objects are properly focused.

SUMMARY OF THE INVENTION

In an embodiment of the invention a range finding device may be operably coupled to an electro-active lens. The range finding device may include a transmitter for transmitting electro-magnetic energy to an object. The range finding device may further include a receiver for receiving a reflection of at least a portion of the electro-magnetic energy from the object. The range finding device may further include a controller operably coupled to the receiver for determining an optical power of the electro-active lens based on an intensity of the reflection.

In an embodiment of the invention a range finding device may be operably coupled to an electro-active lens. The range finding device may include a transmitter for transmitting electro-magnetic energy to an object. The range finding device may further include a receiver for predominantly receiving a diffuse reflection of at least a portion of the electro-magnetic energy from the object. The range finding device may further include a controller operably coupled to the receiver for determining an optical power of the electro-active lens based on an intensity of the reflection.

In an embodiment of the invention a range finding device may be operably coupled to an electro-active lens. The range finding device may include a transmitter for transmitting electro-magnetic energy to an object. The range finding device may further include a receiver for predominantly receiving a diffuse reflection of at least a portion of the electro-magnetic energy from the object. The range finding device may further include a controller operably coupled to the receiver for determining an optical power of the electro-active lens based on a time of flight of the reflection.

In an embodiment of the invention a range finding device may be operably coupled to an electro-active lens. The range finding device may include a transmitter for transmitting electro-magnetic energy to an object. The range finding device may further include a receiver for receiving a reflection of at least a portion of the electro-magnetic energy from the object. The range finding device may further include an optical isolator for primarily allowing a diffuse reflection to reach the receiver and for substantially preventing a specular reflection from reaching the receiver. The range finding device may further include a controller operably coupled to the receiver for determining an optical power of the electro-active lens based on an intensity of the diffuse reflection.

In an embodiment of the invention a range finding device may be operably coupled to an electro-active lens. The range finding device may include a transmitter for transmitting electro-magnetic energy to an object. The range finding device may further include a receiver for receiving a reflection of at least a portion of the electro-magnetic energy from the object. The range finding device may further include an optical isolator for primarily allowing a diffuse reflection to reach the receiver and for substantially preventing a specular reflection from reaching the receiver. The range finding device may further include a controller operably coupled to the receiver for determining an optical power of the electro-active lens based on a time of flight of the diffuse reflection.

In an embodiment of the invention a range finding device may be operably coupled to an electro-active lens. The range finding device may include a focusing element having a fixed focal length for producing a focused image of an object. The range finding device may further include an image sensor array for receiving the focused image and producing an image signal therefrom. The range finding device may further include a controller operably coupled to the image sensor array for determining an optical power of the electro-active lens based on a focus measure of the image signal.

BRIEF DESCRIPTION OF THE DRAWINGS

Embodiments of the invention will be understood and appreciated more fully from the following detailed description in conjunction with the drawings in which like reference numerals indicate corresponding, analogous or similar elements, and in which.

DESCRIPTION OF THE PREFERRED EMBODIMENT

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, well-known features may be omitted or simplified in order not to obscure the present invention. Various examples are given throughout this description. These are merely descriptions of specific embodiments of the invention. The scope of the invention is not limited to the examples given.

Correcting presbyopia with an electro-active lens requires a means for both detecting the presence of objects in the visual field and determining the distance of the objects from a user so that an appropriate amount of correction is applied. If the electro-active lens automatically changes its optical add power whenever the user attempts to focus on an object at a different distance, it is said to provide "on-demand correction". Optical range finding is a possible means for carrying out this task. Optical range finding may be either "active" or "passive". Active range finding works by emitting from a transmitter optical radiation directed at an object a user is looking at within the visual field. The optical radiation may be any eye-safe electro-magnetic radiation such as a laser beam, infrared light or the like. The optical radiation may then be reflected and/or scattered off the object. The reflected and/or scattered optical radiation may then be received with an appropriate receiver. The received optical radiation may then be processed by appropriate circuitry to determine a distance to the object. Passive range finding works without a transmitter. Instead, an appropriate receiver receives ambient sources of light from an object a user is looking at within the visual field. The received light may then be processed by appropriate circuitry to determine a distance to the object.

In describing embodiments of the invention, words such as "determining", "calculating", "processing", and the like may be used. It is to be understood that these operations may be performed by a controller which may include devices such as a processor, a signal processor, an FPGA, a CPLD, or the like. The term "rangefinder" is meant to include all necessary circuitry, electrical connections, transmitters, receivers, controllers, and the like in order to determine a distance to which a user is looking and apply an appropriate amount of optical add power to an electro-active lens. These components may be integrated into one component or may be separated into different components for aesthetic or functional reasons. The controller may be electrically connected to the transmitter and may control when the transmitter transmits a signal, the length of transmission, the power of transmission, and the like. The controller may be electrically connected to the receiver and may receive an electrical signal from the receiver based upon the signal the receiver received. The controller may be electrically connected to the electro-active element and may control the optical power of the element.

In an embodiment of the invention, an active form of range finding known as "time-of-flight" range finding may be used. In a time-of-flight rangefinder a pulse of light may be transmitted to an object in the visual field at which a user is looking. A receiver may receive the light reflected and/or scattered off the object. The distance may then be determined by first measuring the time it takes the light pulse to make a round trip after reflecting and/or scattering off the object. The time may then be divided by two to determine the time it took the light pulse to reach the object. This result may then be multiplied by the speed of light to determine the distance to the object. Once the distance is determined, the rangefinder may adjust the optical add power of the electro-active lens such that the object appears in correct focus to the user.

In such an embodiment, because the speed of light is so fast (nearly 300 million meters per second), light will have a very short round trip time. For example, light reflected off an object that is 5 meters away will have a round trip time of roughly 33 billionths of a second. In order to ensure accurate reception and processing of the signal, the receiving circuitry must operate at least as quickly as the fastest round trip time anticipated. For such applications, due to the small distances involved, gigahertz speeds may be required. Although extremely accurate, a possible disadvantage of such an embodiment is that a time-of-flight rangefinder may draw an excessive amount of electrical power.

In another embodiment of the invention, an active form of range finding known as "intensity" range finding may be used. In an intensity rangefinder light may be transmitted by a transmitter to an object in the visual field at which a user is looking. A receiver may receive the light reflected and/or scattered off the object. A controller may then determined the distance by correlating the intensity of the received light to the distance of the object from the user. Once the distance is determined, the controller may adjust the optical add power of the electro-active lens such that the object appears in correct focus to the user.

Figure 1:
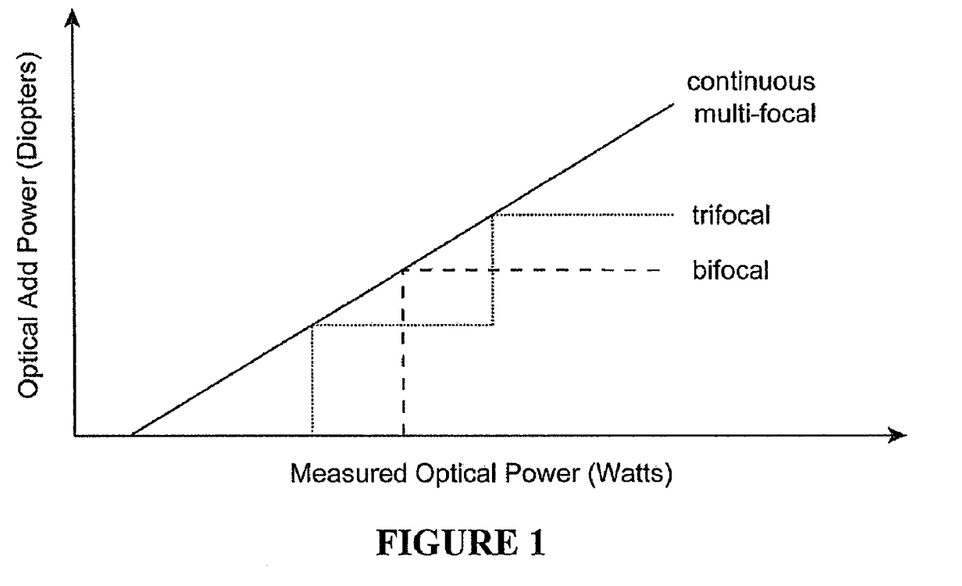
FIG. 1 shows an amount of presbyopia correction (optical add power in diopters) versus a power (in Watts) of light measured by a receiver in an embodiment of an intensity rangefinder.

A range finder that measures intensity may operate on the assumption that all objects reflect and/or scatter light equally. Under such an assumption, an amount of light that is collected by the receiver may be directly correlated to the distance of the object from the transmitter. Based on the determined distance, an appropriate optical add power may be applied to the electro-active lens to properly correct for presbyopia. To correlate measured intensity with optical add power the intensity range finder may use one of the methods that is illustrated in FIG. 1. FIG. 1 shows the amount of presbyopia correction (optical add power in diopters) versus the power (in Watts) of the light measured by the receiver in an embodiment of the invention. In other embodiments of the invention optical add power may be correlated with luminous flux, radiant flux, radiant energy, radiant intensity or the like. It should be noted that the actual optical add power necessary to correct for presbyopia is different for each individual. FIG. 1 is meant to be illustrative of a possible correlation between optical add power and received light and is not indicative of the actual values of such a correlation.

In an embodiment of the invention, one method of correlating optical add power with received light is a continuous multi-focal method which is depicted with a solid line in FIG. 1. In the continuous multi-focal method add power may be continuously adjusted as focusing distance, and hence the received light intensity, changes in order to provide an optimum presbyopia correction. This approach may be difficult to implement, as the drive electronics may be complicated. For example, such a system may require sufficient memory to store a look-up table for all correlation values as well as precision driver circuitry to provide the plurality of voltages that need to be applied to the various electrodes. Additionally, the assumption of equal reflection and/or scattering of light from all objects may not be valid in a great number of situations.

In an embodiment of the invention, another method of correlating optical add power with received light is a discontinuous multi-focal method. A bifocal discontinuous approach is depicted with a dashed line in FIG. 1. A trifocal discontinuous approach is depicted with a dotted line in FIG. 1. In the discontinuous multi-focal method add power may be a fixed value for a range of received light intensities, and hence a range of focusing distances. When the light intensity changes from a first range to a second range, the optical add power may change from a first fixed value to a second fixed value. The point at which the optical add power changes may differ depending on whether the light intensity changes from a first range to a second range or from a second range to a first range. The change in optical add power may be abrupt or may change according to a linear, quadratic, logarithmic or exponential function. Thus, one or more threshold levels may be set for the light intensity such that the optical power only changes when the light intensity crosses the threshold level. As shown in FIG. 1, the bifocal discontinuous approach may be enabled by means of one threshold level while the trifocal discontinuous approach may be enabled by means of two threshold levels. In other embodiments three or more thresholds may be used.

The discontinuous method may be electronically simpler and more functionally robust. The threshold levels may be hardwired within the drive electronics thus negating the need for a complicated look-up table. Additionally, the drive circuitry may only need to provide a small number of voltages. Finally, the threshold levels may be set such that they represent the reflection and/or scattering of light in typical situations in which presbyopia correction is required.

When rangefinders employ a transmitter and receiver to determine distance, it is possible that the transmitted light will reflect off of nearby objects when a user is actually looking past those objects into the distance. In such a scenario, the receiver will receive light from the nearby objects and the rangefinder may erroneously determine that the user is looking at the nearby objects. The rangefinder may then apply too much optical add power to the electro-active lenses and the user may not be able to see distant objects in focus. An example of such a scenario is when a user stands very close to a window while looking into the distance. The transmitted light may reflect off of the window instead of reflecting off of the distant objects causing the range finder to detect the presence of the window and assume that the user is looking at near objects.

In such a situation the reflections off the smooth glass surface are said to be specular and behave in a predictable and well-understood manner such that the angle at which light is incident on a material is equal to the angle at which light is reflected from the material. An everyday example of specular reflections is the reflection of light off of a mirror. Light may also reflect off of a material in a diffuse manner. Diffuse reflections occur when light is incident on a material and the light is reflected back at a number of angles. An everyday example of diffuse reflections is the reflection of light off of matte paints. The well-understood behavior of specular reflections allows the design of a range finding system in which specular reflections may be mostly ignored. Instead, the range finding system may make use of diffusely reflected and/or scattered light to determine object presence and distance. For example, the range finding system may make use of diffusely reflected light to determine the distance to an object by correlating the intensity of the received light to the distance of the object from the user. The range finding system may make use of diffusely reflected light to determine the distance to an object by calculating a time of flight of the light from the object to the user.

In another embodiment of the invention, an active form of range finding known as "diffuse reflection" range finding may be used. In diffuse reflection range finding the transmitter and receiver may be positioned to receive diffuse reflections and not specular reflections.

Figure 2:
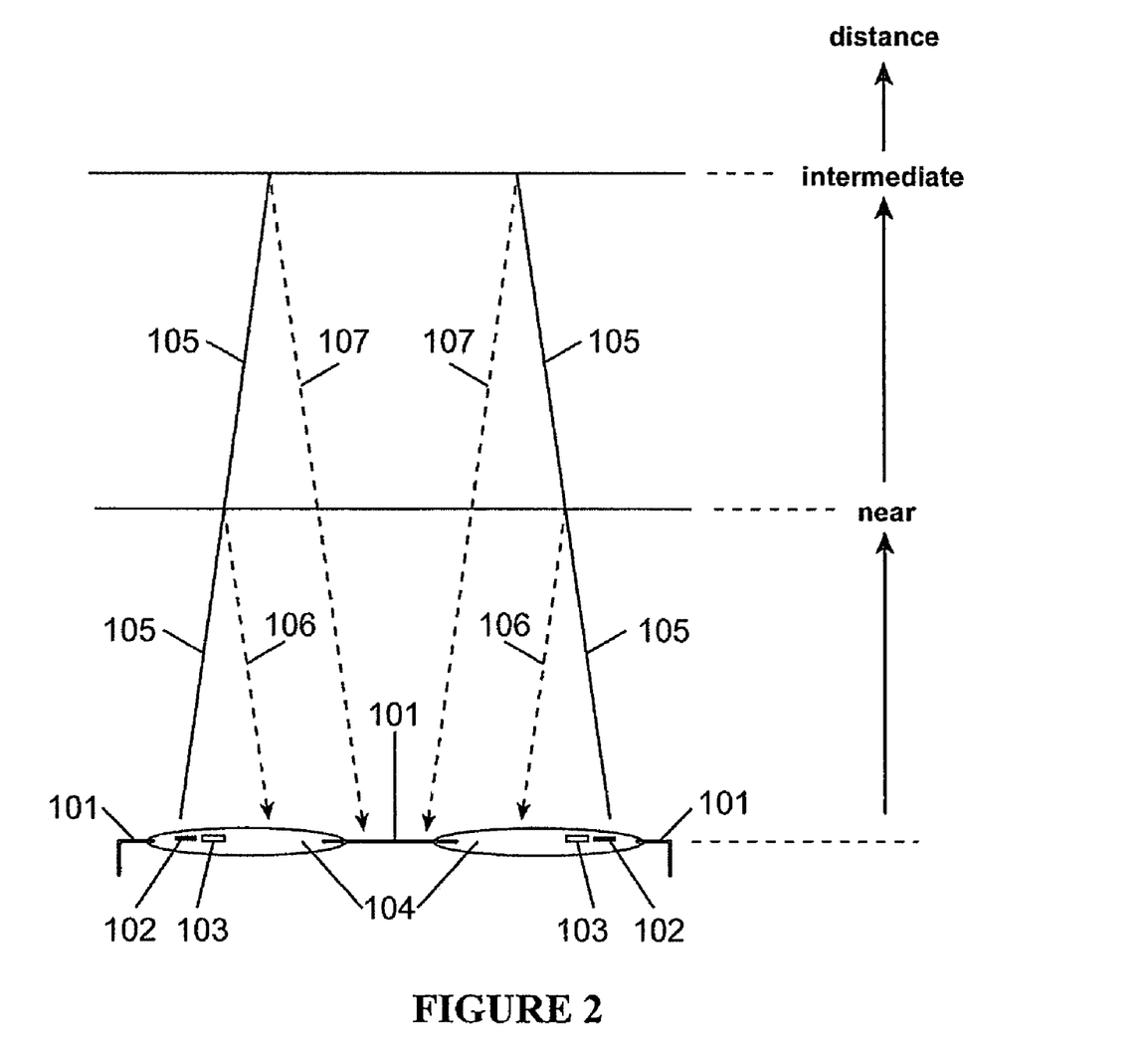
FIG. 2 shows a first embodiment of a diffuse reflection range finder in which a receiver is placed relative to a transmitter such that specular reflected light is directed away from the receiver.

In a first embodiment of the invention shown in FIG. 2, a pair of electro-active spectacles 101 has a controller (not shown) connected to a range finding transmitter 102 and a range finding receiver 103. The transmitter and the receiver may be located near each other. A pair consisting of the transmitter and the receiver may be placed within a lens 104. To reduce specularly reflected light from reaching the receiver, a transmitted light 105 may be emitted at an angle such that a specular reflection from a near distance 106 and a specular reflection from an intermediate distance 107 may be directed away from the receiver. However, a diffuse reflection (not shown) may be received by the receiver. The controller may then use the diffuse reflection to determine a distance from an object to the user and apply an appropriate amount of optical power to the electro-active element such that the object is correctly focused. In the case where light transmitted from the transmitter of one lens is detected by the receiver of the other lens, the time-of-flight of the reflected light may be sufficiently long, or the reflected power sufficiently low, so as to not trigger the operation of the rangefinder.

Figure 3:
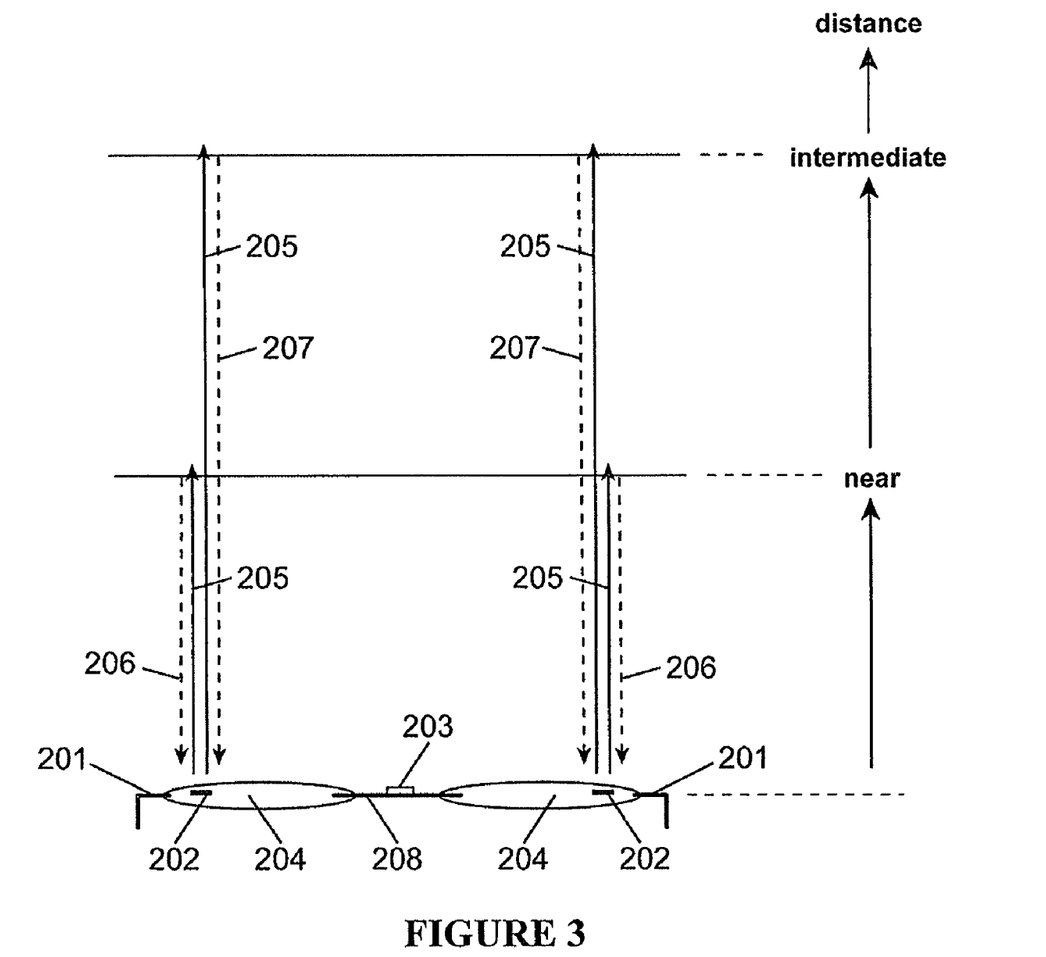
FIG. 3 shows a second embodiment of a diffuse reflection range finder in which a transmitter is placed such that specular reflected light is directed back to the transmitter and away from a receiver.

In a second embodiment of the invention shown in FIG. 3, a pair of electro-active spectacles 201 has a controller (not shown) connected to a range finding transmitter 202 and a range finding receiver 203. The transmitter and the receiver may be located separately from each other. The transmitter may be placed within a lens 204 and the receiver may be placed within a frame 208. To reduce specularly reflected light from reaching the receiver a transmitted light 205 may be emitted at an angle such that a specular reflection from a near distance 206 and a specular reflection from an intermediate distance 207 may be redirected back to the transmitter and away from the receiver. However, a diffuse reflection (not shown) may be received by the receiver. The controller may then use the diffuse reflection to determine a distance from an object to the user and apply an appropriate amount of optical power to the electro-active element such that the object is correctly focused. In the case where light transmitted from the transmitter of one lens is detected by the receiver, the time-of-flight of the reflected light may be sufficiently long, or the reflected power sufficiently low, so as to not trigger the operation of the rangefinder.

In the above embodiments depicted in FIGS. 2-3 the transmitter and receiver are shown placed in certain positions of the frame and lenses. It should be noted that other placements are possible as long as the transmitter and receiver are located relative to one another to prevent the receiving of specular reflections. For example, the transmitter and the receiver may, separately or together, be placed on or in a frame, on or in a frame hinge, on or in a nose bridge or on or in a lens.

Figure 4A:
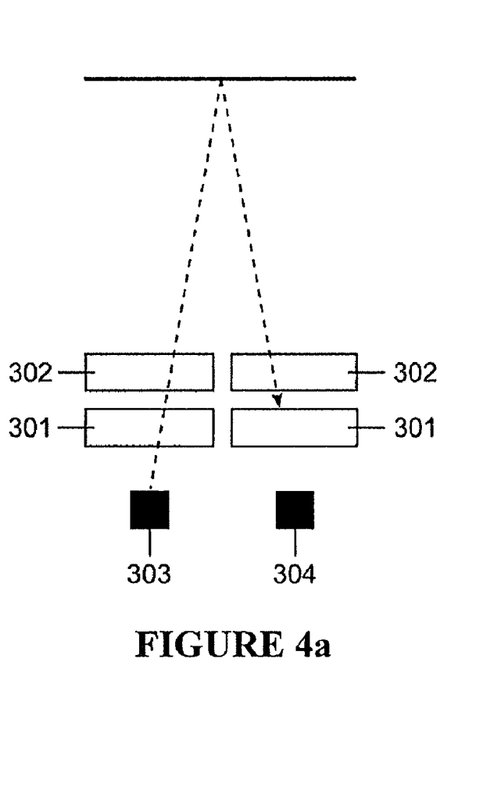
FIGS. 4a and 4b show an embodiment of an optical isolator used in an active range finder.
Figure 4B:
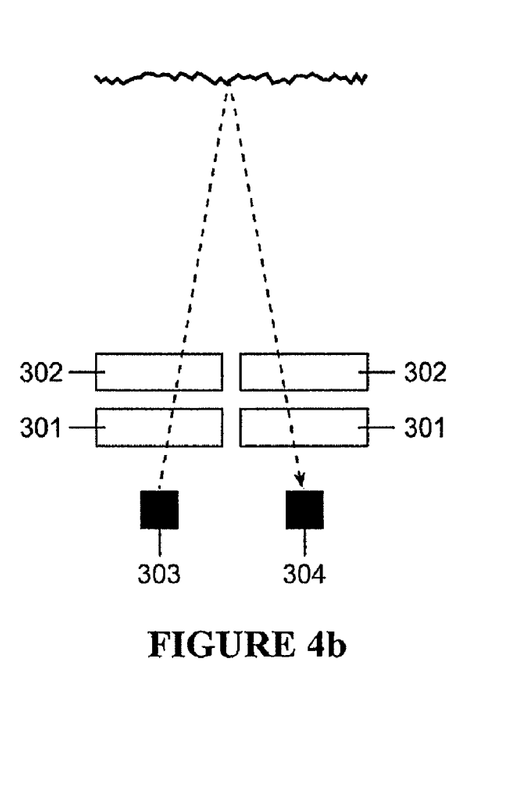

While the above transmitter and receiver configurations may reduce the possibility of specular reflections reaching the receiver, these configurations may not completely eliminate the possibility of such an occurrence. In an embodiment of the invention shown in FIG. 4a and FIG. 4b an optical isolator may be used to completely block specular reflections of transmitted light in an active rangefinder. The rangefinder may include a controller (not shown) connected to a range finding transmitter 303 and a range finding receiver 304. Because the optical isolator completely blocks specular reflections, the transmitter and the receiver may be located relative to one another such that specular reflections would normally reach the receiver. As shown in FIGS. 4a and 4b, an optical isolator is comprised of a linear polarizer 301 and a quarter-wave plate 302 in series. The linear polarizer may be placed in front of the transmitter and the receiver and the quarter-wave plate may be placed in front of the linear polarizer. In embodiments of the invention, the linear polarizers and quarter-wave plates may be made from thin plastic films laminated together and may be used as a "filter" for blocking specular reflections. The polarization axis, or pass axis, of the polarizer may be oriented at 45 degrees to either the slow or fast axis (the two axes are orthogonal) of the quarter-wave plate. In such an orientation, unpolarized light emitted from the transmitter emerges from the optical isolator circularly polarized with either right-handedness or left-handedness.

In FIG. 4a, the circularly polarized light is reflected from an optically smooth surface (producing a specular reflection) and, in a physical phenomenon well known in the art, the handedness of the circular polarization switches (either left to right or right to left). Upon reaching the receiver, the quarter-wave plate acts upon the light and changes the polarization state of the light back to linear. However, due to the change in handedness that occurred upon reflection, the plane of linear polarization is now orthogonal to the polarization axis of the polarizer. Therefore, the polarizer blocks the specularly reflected light from reaching the receiver. In FIG. 4b the configuration is identical, but the light now interacts with an optically rough surface and is scattered back towards the receiver. In this case, the polarization state of the light is not maintained (the polarization is now more random). Therefore, some of the light will pass through the polarizer and reach the receiver. The controller may then use the received reflection to determine a distance from an object to the user and apply an appropriate amount of optical power to the electro-active element such that the object is correctly focused.

Active range finding systems may consume a considerable amount of electrical power since it may be required to generate a signal of sufficient power to ensure a good signal to noise ratio for the return signal. Additionally, in time-of-flight range finding systems the high sampling speed required to determine the roundtrip may also require significant electrical power.

In another embodiment of the invention, a passive form of range finding known as "focus measure" range finding may be used. In focus measure range finding one or more image sensor arrays may be used. The image sensor array may be CCD or CMOS imaging circuits such as those employed in digital cameras and the like. Each image sensor array may be covered by a focusing element which provides correct focus at a different focal distance. For example, three image sensors arrays may be used such that the first one provides correct focus for near distances, the second one provides correct focus for intermediate distances and the third one provides correct focus for far distances. Other arrangements are possible. For example, only two image sensors arrays may be used in which one provides proper focus for near distances and the other for far distances. As a user looks at objects at various distances, a determination of which image sensor array provides an in-focus image may be made. Based on this determination, a correct amount of optical add power may be provided to the electro-active lens.

An in-focus image may generally have higher contrast than an out-of-focus image. Thus, algorithms which measure contrast may be used to determine which image sensor array provides an in-focus image. The focus of the electro-active lens may not be changed unless the measure of contrast provided by one image sensor array is statistically better than the measure of contrast provided by another image sensor array. If no image sensor array provides a statistically better measure of contrast the electro-active lens may be focused at a far distance. Alternately, the electro-active lens may retain its current focusing power.

Image contrast, and hence the measure of focus, may be computed in many ways. Some enabling examples are listed below where the electrical signals ($a_i$, $a_j$) produced by adjacent pixels of the image sensor arrays may be used to calculate contrast. Other methods of determining best focus may be employed as well.

In a first embodiment of the invention image contrast is determined by a sum of absolute differences. The sum of all neighboring pair-wise differences is computed by:

$$FM = \Sigma_{i,j \in \Omega} \Sigma_{k=-1:1, l=-1:1} |a_{i,j} - a_{i+k,j+l}|$$

where $\Omega$ denotes the entire array. This statistic may be readily computed in analog circuitry or in digital circuitry.

In a second embodiment of the invention image contrast is determined by a thresholded sum of absolute differences. The above sum of absolute differences may suffer from artifacts of aliasing of edges and noise. A modification thereof may be to use a thresholded version of sum of absolute differences whereby only differences over a certain threshold value are contained in the sum. Let $$f_{th}(x, y) = \begin{cases} |x - y| & \text{if } |x - y| > th \\ 0 & \text{otherwise} \end{cases}$$

then, a measure of focus is:

$$FM = \Sigma_{i,j \in \Omega} \Sigma_{k=-1:1, l=-1:1} f_{th}(a_{i,j}, a_{i+k,j+l}).$$

The threshold (th) may be determined a priori by categorizing the statistics of the imaging array and the focusing element. This statistic may be computed in analog circuitry, but is more readily computed in digital circuitry.

In a third embodiment of the invention image contrast is determined by a mean square of derivative. The square of the local derivative can be estimated from either the nearest neighbors or next-nearest neighbors by the following estimator:

$$FM = \Sigma_{i,j \in \Omega} \Sigma_{k=-2:2, l=-2:2} b_{k,l} * (a_{i,j} - a_{i+k,j+l})^2$$

where $b_{k,l}$ are radially-decaying coefficients. This statistic may be most ready computed in digital circuitry.

The Focus Measure (FM) statistics from each image sensor array may be calculated by a controller. Although no requirement precludes the use of multiple statistics for each image sensor, power considerations likely limit how many statistics may be calculated for each sensor. The statistics computed for each sensor may then be compared. A statistic may be considered better than another if it is simply larger. Alternately, a statistic may only be considered better than another if it is larger by a threshold amount.

Figure 5:
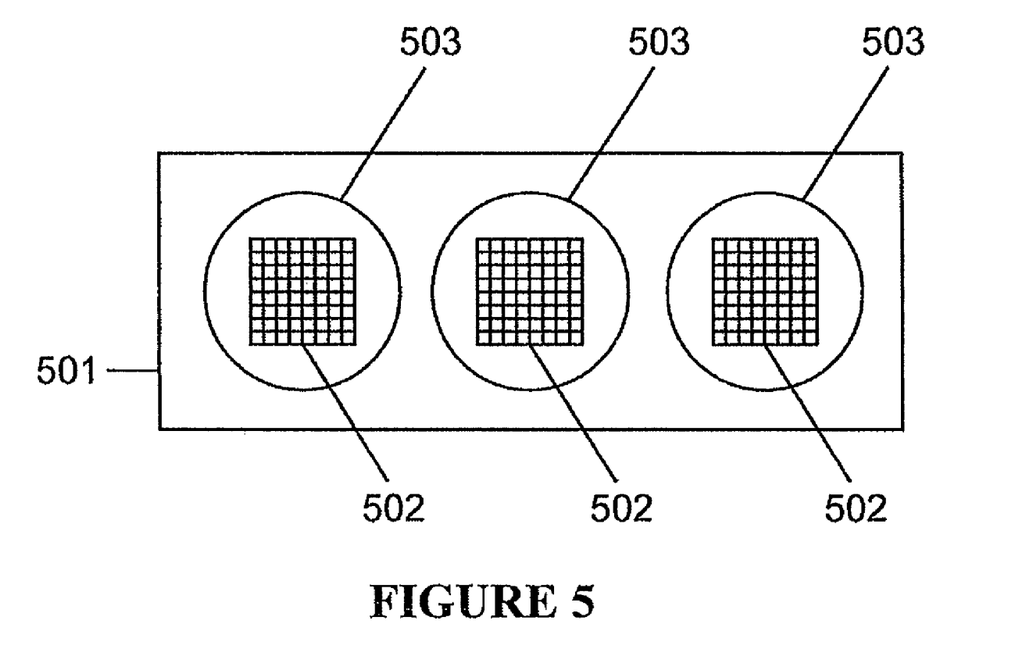
FIG. 5 shows an embodiment of a focus measure range finder.

In an embodiment of the invention shown in FIG. 5, the range finding system may be composed of a controller (not shown) connected to three distinct image sensor arrays 502 which may be located on a single integrated circuit die or chip 501. Focusing elements 503 may be placed over the arrays at the appropriate distance via a molding or deposition process. By way of example only, each of the three image sensors could be less than 500 µm×500 µm in size and be comprised of an 8×8 array of pixel elements for a total of 192 detector pixels.

There are several types of image sensor arrays that can be used. The following is a non-exhaustive list of enabling examples, which is not intended to limit the scope of the present invention.

In an embodiment of the invention standard CMOS sensors with a Digital Signal Processor (DSP) may be used. This may be of the form of a typical CMOS sensor where each pixel outputs a voltage which is amplified, sampled, and then converted to a digital signal via an Analog to Digital Converter (ADC). The focus statistics may be calculated in a DSP after the signals are converted to digital form.

In an embodiment of the invention analog "silicon retina" like sensors can also be used. These may consist of CMOS photodiodes which send out a voltage, but which are tied together via a lateral-resistive layer and appropriate amplifiers. The output of each array may be proportional to an appropriate focusing statistic.

In an embodiment of the invention analog differential amplification may be used. In this case the array may consist of CMOS photodiodes connected in pair-wise arrangement via differential amplifiers or by a multiplexing bus feeding differential amplifiers. The integral of the amplifier outputs may correspond to the sum of absolute differences focus statistics.

The focusing elements used to form images on the individual image sensors may include, by way of example only, refractive lenses, diffractive lenses, or lenslet arrays comprising either refractive or diffractive lens elements. The benefit of using diffractive optics is that they can be patterned on a thin substrate, which conserves space. Regardless of the optics employed the lens should be designed for best focus at or near the wavelength of peak optical response in the human eye, namely 550 nm.

To further conserve electrical power, a photochromic dye, a material that changes its optical absorption properties when exposed to light, may be incorporated in or on the focusing elements to act as a passive optical intensity filter. If the pixels of the image sensors receive too much light, they may not be able to generate any meaningful data and thus it may be impossible to determine the best focus. Typically, this situation may be corrected by introducing circuitry to adjust the electronic "gain" (i.e. signal amplification) of the pixel elements, which may require additional electrical power to operate. Photochromic dye materials draw no electrical power and their behavior is well known in the art due to their use in spectacle lenses. Depending upon the material from which the focusing elements are fabricated, the photochromic dye may be incorporated directly with the optical material or added as a thin film after the optics have been fabricated. In either case, when exposed to high levels of optical radiation, the optical absorption of the dye will increase, thus reducing the amount of light that reaches the image sensors.

In embodiments of the invention, the rangefinders described above may be combined in order to provide added accuracy and redundancy. The rangefinders may be used simultaneously or alternately depending on which rangefinder is better suited to a specific scenario. Both passive and active rangefinders may be combined in this way. For example, an intensity range finder may be combined with a time-of-flight rangefinder. As another example, a focus measure rangefinder may be combined with a time-of-flight range finder. Other combinations may be possible. In certain combinations, the transmitters and/or the receivers may be used by more than one range finding system. For example, the same transmitter and receiver may be used for both time-of-flight and intensity range finding.

In embodiments of the invention, the electro-active element may be combined with a progressive addition lens. In other embodiments, the electro-active element may be combined with a bifocal, trifocal or other multifocal lens. In other embodiments, the electro-active lens may be combined with a lens with a single optical power. The electro-active element may either be placed inside the lens or on an outer surface of the lens. A covering layer may also be applied to the lens assembly.

In embodiments including a base multifocal lens, the base lens may provide sufficient optical power to allow a user to see with correct focus at more than one distance. For example, the base lens may allow a user to focus correctly at both far distances and intermediate distances. As another example, the base lens may allow a user to focus correctly at both far distances and near distances. Other combinations are possible. In embodiments including a base single focal lens, the base lens may provide sufficient optical power to allow a user to see with correct focus at one distance. For example, the base lens may allow a user to focus correctly at a far distance. Other distances are possible.

In embodiments in which the electro-active element is combined with a base lens, the range finding system may be significantly simplified. The electro-active element may be constructed such that when substantially no electrical power is applied to the element, the element has substantially no optical power. In other words, when substantially no electrical power is applied to the element, the element's refractive element is approximately the same as the base lens or substrate. Thus, when substantially no electrical power is applied to the element, the optical power of the lens as a whole is the same as the optical power of the base lens or substrate. This may significantly simplify the range finding system since certain distances may no longer need to be detected. For example, if a base lens provides far distance correction, the range finding system may only need to detect whether or not a user is looking to a near or intermediate distance. If the user is looking at a far distance the range finding system may apply no electrical power to the lens. If the user is looking at a near or intermediate distance, the range finding system may apply appropriate electrical power to the lens. If intermediate distance correction is not needed, the range finding system may be further simplified by only detecting whether or not a user is focused at a near distance. As another example, if a base lens provides intermediate and far distance correction, the range finding system may only need to detect whether or not a user is focused at a near distance.

In embodiments of the invention, the rangefinder may include a manual override switch connected to the controller for allowing a user to override the optical add power applied to the electro-active element by the rangefinder. The manual override switch may be used in situations where the rangefinder malfunctions or incorrectly determines a user's focusing distance and thus applies an incorrect amount of optical add power to the electro-active element. In such situations objects may appear out of focus. The manual override switch may then be used to manually set a different optical add power than was computed by the rangefinder. The manual override switch may be a contact switch, a capacitive switch, a tilt switch, a variable switch, and the like.

What is claimed:

1. A rangefinder operably coupled to an electro-active lens, the rangefinder comprising:
 a plurality of image sensor arrays where each of said image sensor arrays is covered by a focusing element having a fixed focal length to provide a desired focus at a different focal distance by measuring contrast of a focused sensed image received by the image sensor array; and
 a controller connected to each of the plurality of image sensor arrays where the controller is used to measure the contrast of each of the image sensor arrays and electrical signals produced by adjacent pixels of each of the image sensor arrays are used by the controller to calculate contrast using a threshold sum of absolute differences algorithm to determine an appropriate optical power of the electro-active lens based on the measured contrast.

2. The rangefinder of claim 1 where the electroactive lens comprises a progressive addition lens.

3. The rangefinder of claim 1 where the optical power determined by the controller is applied to the electro-active lens such that the sensed image resulting from an object is correctly focused.

4. The rangefinder of claim 1 where the optical power determined by the controller to correctly focus the sensed image from an object corresponds to the measured contrast of an image sensor array that is statistically better than the measured contrast of another image sensor array sensing the same object.

5. The rangefinder of claim 1 where each of said image sensor arrays comprises CMOS (Complementary Metal Oxide Semiconductor) photodiodes tied together via a lateral resistive layer and electrically connected to amplifiers.

6. The rangefinder of claim 1 where each of said image sensor arrays comprises CMOS (Complementary Metal Oxide Semiconductor) sensors with a Digital Signal Processor (DSP).

7. The rangefinder of claim 1 where each of said image sensor arrays comprises CMOS (Complementary Metal Oxide Semiconductor) photodiodes connected in pair wise arrangement via differential amplifiers.

8. The rangefinder of claim 1 where each of said image sensor arrays comprises CMOS (Complementary Metal Oxide Semiconductor) photodiodes connected in pair wise arrangement via multiplexing bus feeding differential amplifiers.

9. The rangefinder of claim 1 where a photochromic dye is incorporated in or on the focusing elements to act as a passive optical intensity filter.

10. The rangefinder of claim 9 where the focusing elements are refractive lenses.

11. The rangefinder of claim 10 where the focusing elements are designed to focus light having a wavelength of about 550 nm.

12. The rangefinder of claim 9 where the focusing elements are diffractive lenses.

13. The rangefinder of claim 12 where the focusing elements are designed to focus light having a wavelength of about 550 nm.

14. The rangefinder of claim 9 where the focusing elements are lenslet arrays comprising either refractive or diffractive lens elements.

15. The rangefinder of claim 14 where the focusing elements are designed to focus light having a wavelength of about 550 nm.

* * * * *